United States Patent [19]

Levasseur

[11] Patent Number: 5,892,210
[45] Date of Patent: Apr. 6, 1999

[54] SMART CARD READER WITH LIQUID DIVERTER SYSTEM

[75] Inventor: Joseph L. Levasseur, Town and Country, Mo.

[73] Assignee: Coin Acceptors, Inc., St. Louis, Mo.

[21] Appl. No.: 728,635

[22] Filed: Oct. 10, 1996

[51] Int. Cl.[6] .................................................... G06K 5/00
[52] U.S. Cl. ........................................ 235/380; 235/435
[58] Field of Search .................................. 235/486, 449, 235/475, 492, 380

[56] References Cited

U.S. PATENT DOCUMENTS 4,687,268  8/1987  Picciotto et al. ............................ 439/55
5,484,989  1/1996  Kumar et al. ............................. 235/435
5,532,466  7/1996  Konno et al. ............................. 235/441
5,698,832  12/1997 Someya et al. ......................... 235/449

Primary Examiner—David P. Porta
Assistant Examiner—Diane I. Lee
Attorney, Agent, or Firm—Cohn, Powell & Hind

[57] ABSTRACT

This credit card reader (10) with a liquid diverting system (50, 52) includes a reader housing having lower and upper housing portions (12) and (14) and having an outwardly disposed entry portion (36, 46) defining an opening leading to a credit card enclosure (16) retained within the housing and having an opening 70. The liquid diverting system (50, 52) includes a movable member (50) movable from a first position blocking the enclosure (16) and providing drainage, to a second, flexed position permitting entry of a credit card (SC) into the enclosure (16).

7 Claims, 6 Drawing Sheets

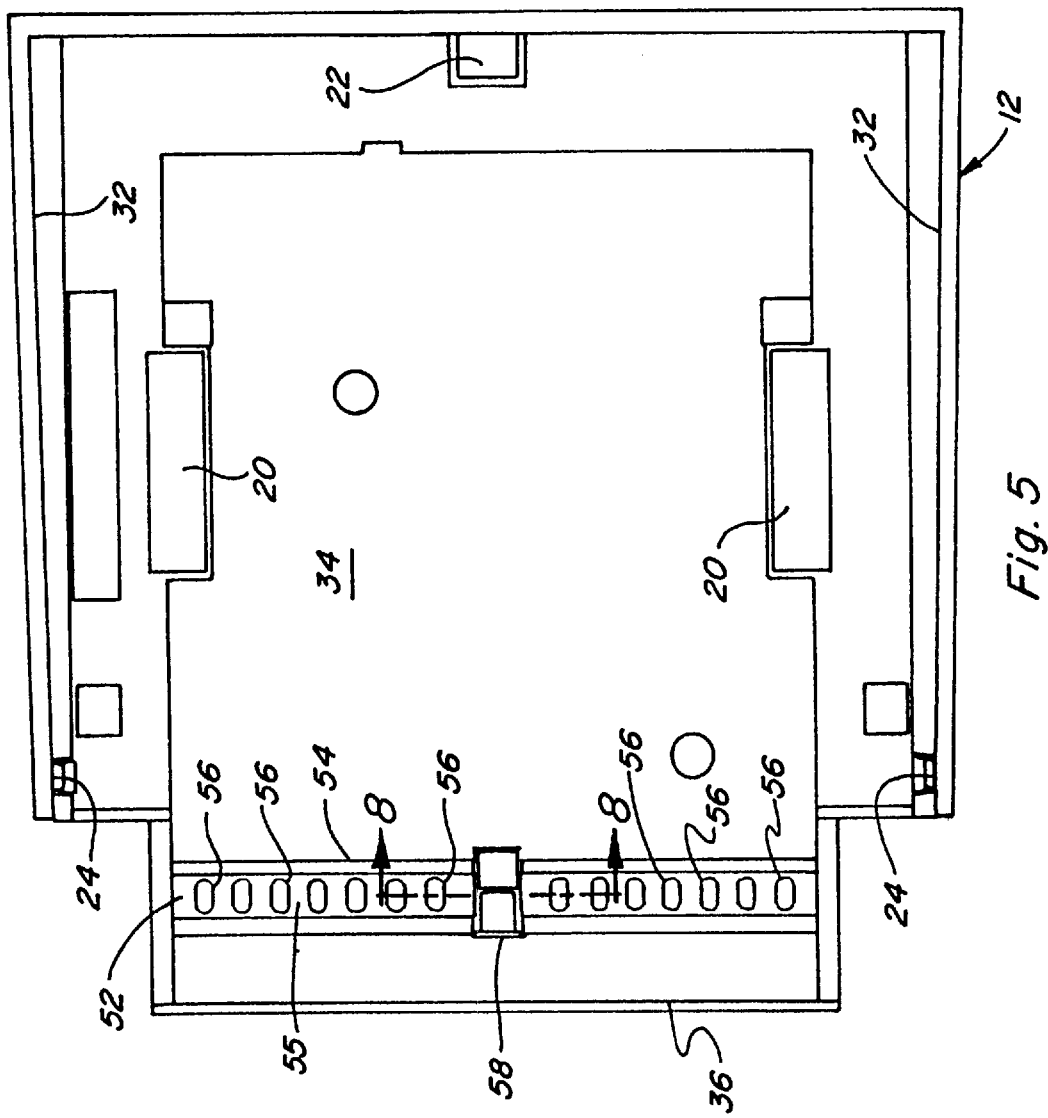

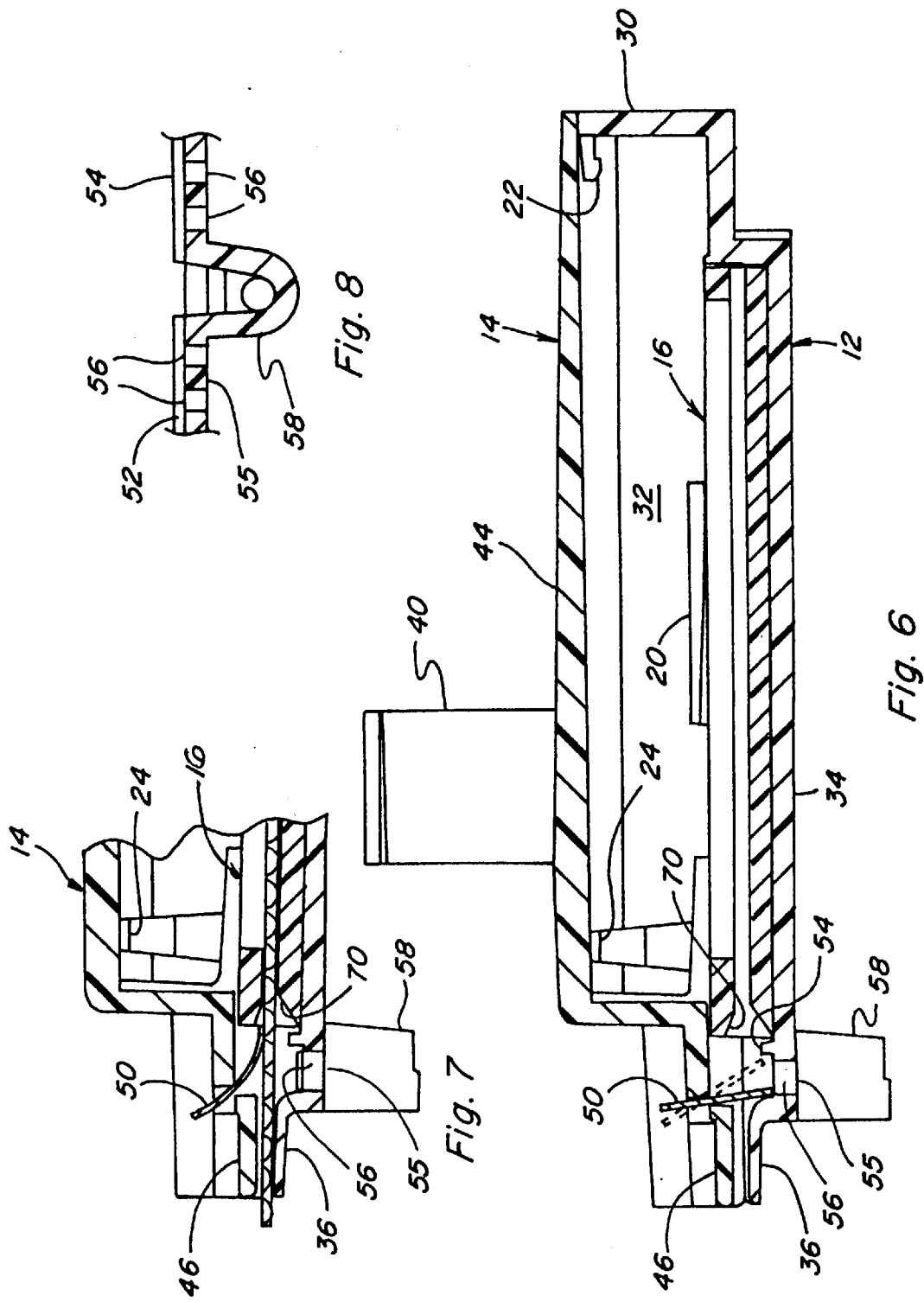

SMART CARD READER WITH LIQUID DIVERTER SYSTEM

BACKGROUND OF THE INVENTION

This invention relates generally to the protection of vending machines against the introduction of liquid into such machines and particularly to the protection of credit card readers by providing such readers with a liquid diverter for deflecting and draining the liquid away from the reader.

The problem of vandalizing vending machines by introducing liquid, particularly salt water, into a machine by way of the coin accepting chute, and bill validator entryway is a serious one. Such vandalism has now spread to credit card readers, sometimes referred to as "smart card" readers because the cards have a built-in electronic chip which is "read" by the reader in lieu of using currency. Such liquid not only tends to cause the electronic parts of the vending machine to malfunction due short circuiting but also causes corrosion of sensitive parts. Thus, not only can the vending machine be robbed of its merchandise and cash as a result of a precipitated discharge but, in addition, the destruction of the vending machine parts can occur which requires expensive repair or replacement.

Attempts to solve this problem with respect to bill validators are well known and are disclosed in U.S. Pat. No. 5,318,164 which discloses an electronic moisture sensor, and in U.S. Pat. No. 5,505,289 which discloses a built-in drainage system within the entryway to carry the liquid away. The first device tends to be expensive and has the disadvantage of shutting down vending by the machine. The second device has limited liquid capacity over a localized area. Neither of these devices is readily adaptable to smart card readers because such readers must not only divert the liquid but it must also permit entry of the card into the enclosure within the smart card reader housing. Another device for providing protection for bill validators is disclosed in commonly owned U.S. patent application Ser. No. 08/570,381 which is simple and has a large capacity but is not a specifically arranged structure to provide a first stage protection for smart card readers. U.S. Pat. No. 5,484,989 is also of interest as disclosing a card reading terminal having flexible flaps extending over the card-receiving inlet to prevent the ingress of debris. It is not intended to shield the terminal against liquid and has no provision for drainage.

The present liquid diverting device avoids these and other disadvantages and provides a solution to the problem of diverting liquid from a smart card reader in a manner neither revealed nor suggested in the known prior art.

SUMMARY OF THE INVENTION

This protective device is in the form of a liquid diverter system for a smart card reader for vending machines, and the like, and provides a means of avoiding or minimizing damage to vulnerable parts of the reader by diverting liquid introduced into the reader by vandals, without using expensive moisture sensors and complicated drainage devices.

The device can be used in conjunction with a bill validator by attaching it directly underneath a bill validator. It can also be used independently of a bill validator.

The invention is structured to provide specific protection for a smart card reader and provides the reader with a built-in liquid deflector and drainage system which provides protection against the introduction of liquid into the reader.

This credit card reader with a liquid diverter system, comprises a housing including an entry portion adapted to receive a credit card; a credit card enclosure disposed within the housing and including an entry portion adapted to receive the credit card; and liquid diverting means disposed within the entry portion of the housing substantially preventing liquid introduced into the housing entry from entering the credit card enclosure but permitting entry of the credit card into the enclosure.

It is an aspect of this invention that the liquid diverting means includes a movable means and a drainage means, the movable means being movable from a position diverting liquid into the drainage means, while blocking entry into the enclosure, to a position unblocking the entry into the enclosure to permit insertion of the credit card into the enclosure.

It is another aspect of this invention that the movable means includes a flap engageable by the credit card and swingable from a first position blocking entry into the enclosure and diverting liquid into the drainage means, to a second position unblocking entry into the enclosure.

It is yet another aspect of this invention that the housing entry portion includes an upper portion and a lower portion; and the flap resilient and is disposed in the housing entry portion in swinging relation to the upper portion and the drainage means includes a drainage trough disposed in the lower portion and having a plurality of openings facilitating vertical drainage of liquid from the housing.

It is still another aspect of this invention that the housing includes a lower portion and an upper portion, said upper portion being disposed in snap-fitting relation to said upper portion, said lower and upper portions having outwardly extending portions cooperating to define the housing entry portion.

It is another aspect of this invention that the upper portion of the housing entry portion includes spaced openings and the flap includes spaced ears received by associated openings to hold the flap in swinging relation, and the lower housing portion includes rib means retaining the enclosure within the housing.

It is yet another aspect of this invention that the rib means defines a side of the trough and the trough includes a plurality of drainage openings and means carrying liquid from the drainage openings away from the housing.

This smart card reader with built-in protection against the introduction of liquid is simple and inexpensive to manufacture, and is highly effective for its intended purpose.

BRIEF DESCRIPTION OF THE DRAWINGS

FIG. 5 is a plan view of the lower housing of the smart card reader;

FIG. 6 is a cross sectional view taken on line 6—6 of FIG. 4 before card insertion;

FIG. 7 is a fragmentary cross sectional view similar to FIG. 6 following card insertion; and FIG. 8 is a fragmentary cross sectional view taken on line 8—8 of FIG. 5.

DESCRIPTION OF THE PREFERRED EMBODIMENT

Figure 1:
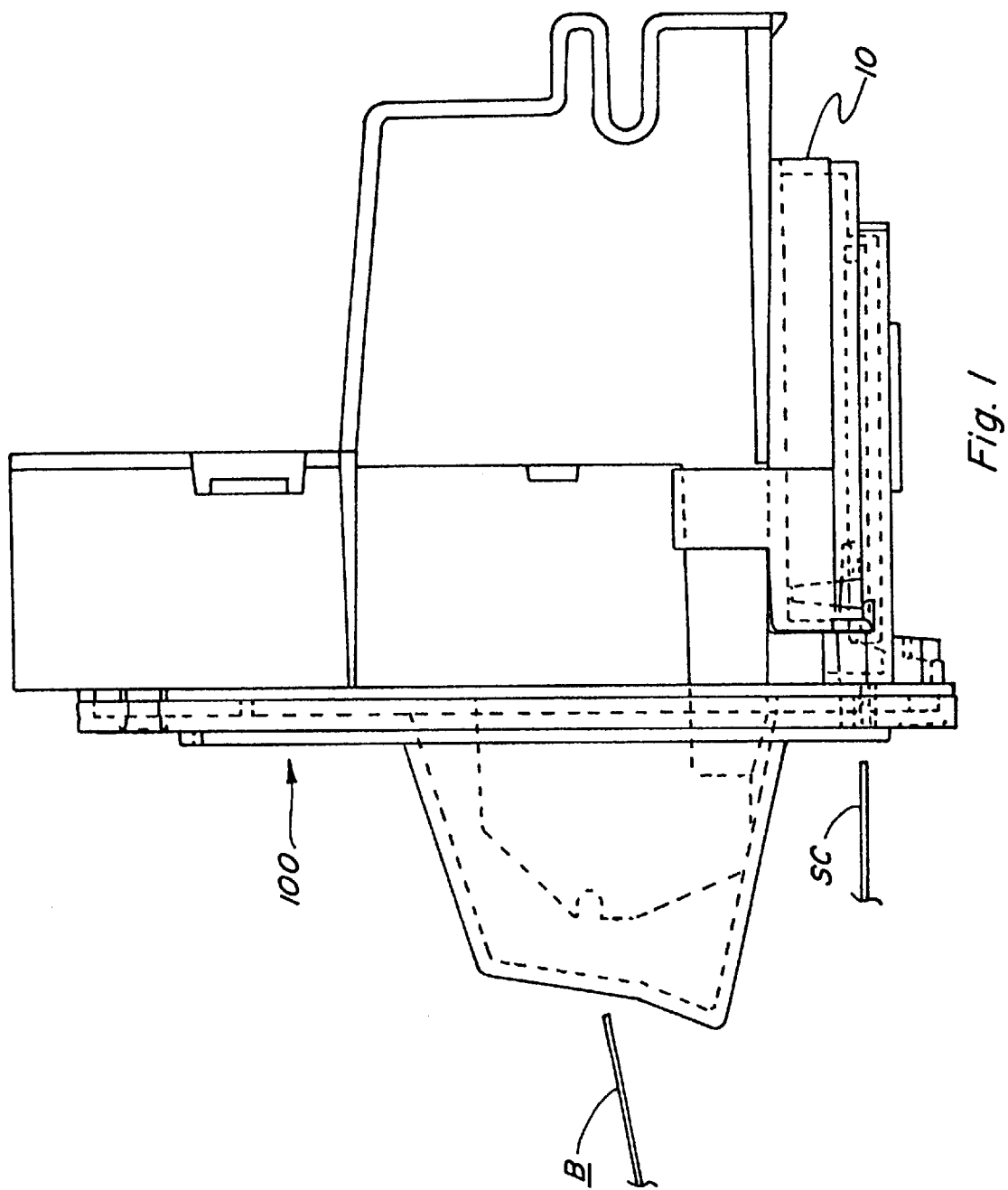
FIG. 1 is a side elevational view of the smart card reader mounted to the underside of a bill validator.
Figure 2:
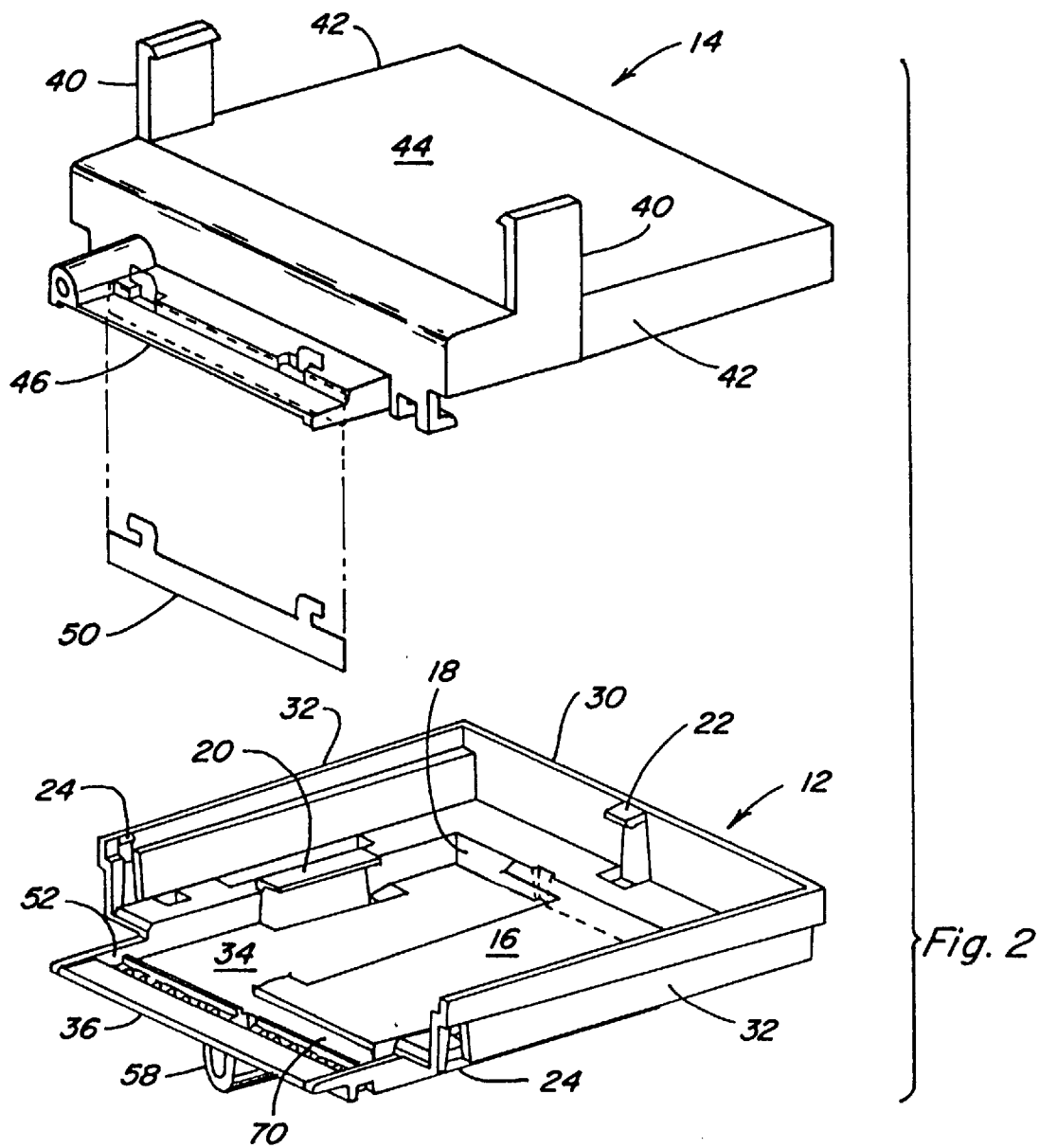
FIG. 2 is an exploded perspective view showing the parts of the smart card reader.
Figure 3:
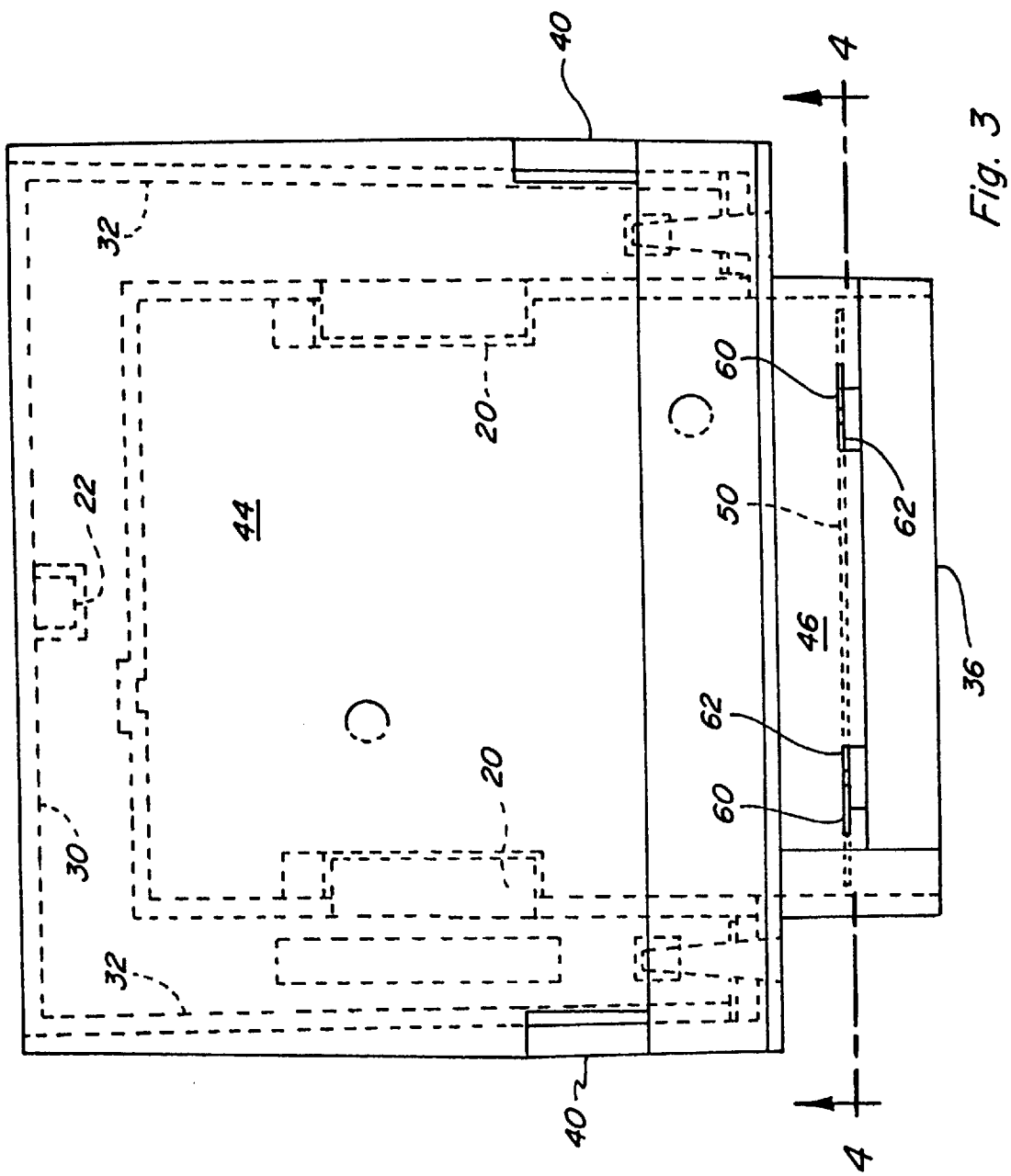
FIG. 3 is a plan view of the smart card reader.
Figure 4:
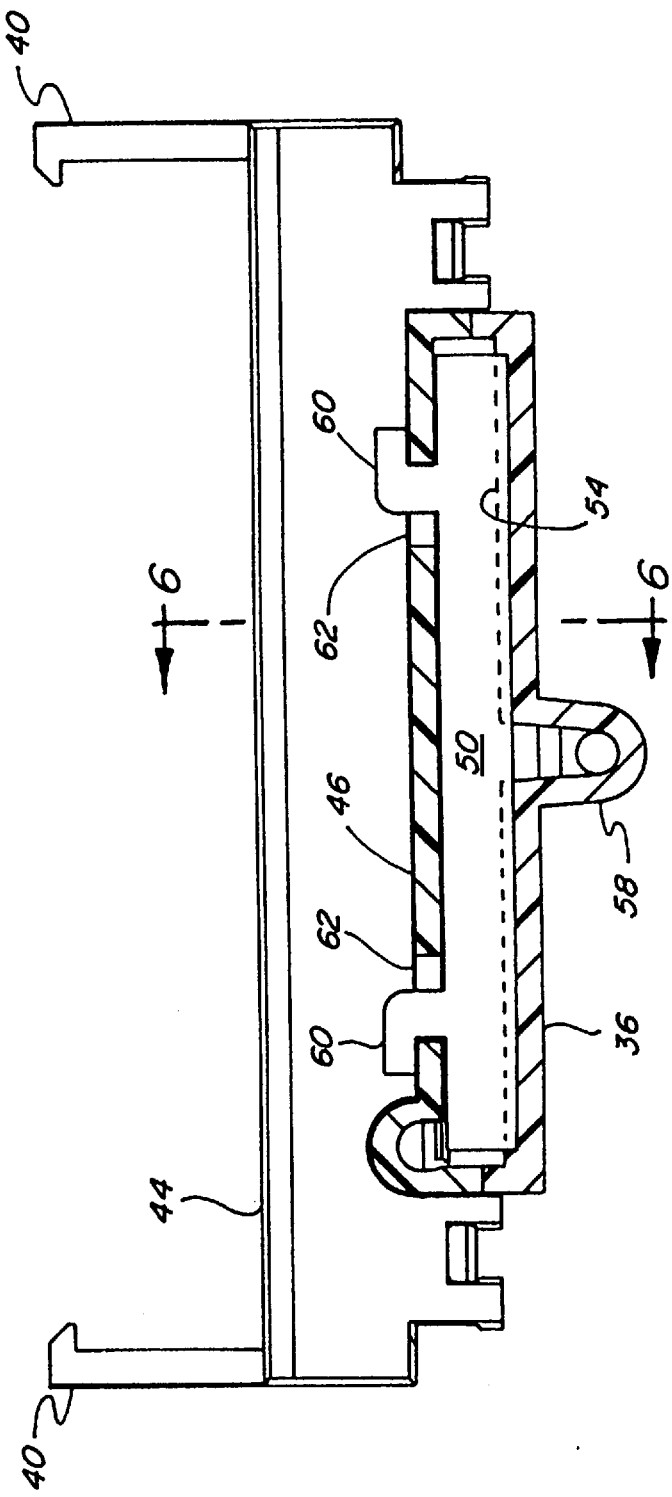
FIG. 4 is a cross-sectional view taken on line 4—4 of FIG. 3 showing the swinging flap.

Referring now by reference numerals to the drawings and first to FIGS. 1–4 it will be understood that the smart card reader with a built-in liquid diverter, indicated by numeral 10, is shown attached in snap-fitted relation to the bottom of a bill validator which is indicated by numeral 100. The bill validator 100 is adapted to receive a bill B at the front end and is similar to that shown in commonly owned U.S. Pat. No. 5,310,173 which is incorporated herein by reference.

The smart card reader 10 is adapted to receive a smart card SC, so-called because it is provided with a chip which is recognized by the reader 10. The smart card reader 10, in the embodiment shown includes a lower housing 12, an upper housing 14 and a card enclosure 16, which is disposed within a cavity 18 formed in the lower housing 12, and held in place by means of opposed side clips 20.

The lower housing 12 includes a rear wall 30, ledged side walls 32 and a bottom wall 34, which is stepped to form the enclosure cavity 18 and is extended outwardly to form an entrance portion 36. The upper housing 14, in the embodiment shown, does not include a rear wall but does include side walls 42 and a top wall 44 which overfit the side walls 32 of the lower housing 12. The upper housing 14 is also extended outwardly to form a smart card entrance portion 46 which cooperates with the entrance portion 36 of the lower housing 12 to define an entrance 70. The upper housing also includes clips 40, which are received in snap-fit relation in openings (not shown) provided on the underside of the bill validator 100. The upper housing 14, in the embodiment shown attached to the lower housing 12, in snap-fit relation, held in place by end clip 22 and side clips 24.

The smart card reader 10 represents an improvement over the prior art in that it includes a liquid diverter and drainage system consisting essentially of a diverter flap 50 and a drainage trough 52 as will now be described with particular reference to FIGS. 4–8.

As best shown in FIGS. 4–8 the lower housing front portion 36 is formed into a trough 52, which is defined on the inner side by the smart card enclosure elongate retainer rib 54 and on the outer side by the smart card entrance portion 36. The trough 52 includes a plurality of transversely disposed drainage openings 56, which permit rapid vertical drainage from the trough 52. The upper housing entrance portion 46 includes a pair of openings 62 which receive the diverter flap 50. To this end, the diverter flap 50 includes a pair of compatibly formed ell-shaped ears or lugs 60 which are bendable so that they are received in retained relation within openings 62. The flap 50 is supported at its lower end by the apertured bottom of the trough 52 by the web portions 55 separating the openings 56. The lower housing 36 also includes a depending attachment lug 58 for assisting in connecting the reader 10 to the bill validator 100.

It will be understood that the flap 50 can be formed from any thin resilient plastic material such as Lexan, or from metal which can be moved to a blocking position by the force of liquid entry and yet is yieldable to permit the card to be introduced into the reader enclosure 16.

In the event that liquid is introduced into the smart card entrance opening 70 defined by the cooperating lower and upper entrance portions 36 and 46, respectively, the force of the liquid swings the flap 50 toward the elongate retainer rib 54, as shown in phantom outline in FIG. 6, thereby deflecting the liquid into the drainage openings 56 for rapid vertical drainage and blocking the entrance 70 to the smart card enclosure 16. However, when the smart card SC is introduced into the smart card enclosure entrance 70, the resilient diverter flap 50 pivots about the lugs 60 on engagement with the smart card and assumes the position shown in FIG. 7 to permit full insertion of the smart card SC into the enclosure 16. It will be understood that liquid may be introduced or squirted into the opening, for example, by a squeeze bottle with a spout or similar means.

While the credit card reader in the embodiment shown is made from plastic material such as Lexan, other plastics or metal could be used. In addition, while the assembly shown is made for attachment beneath a bill acceptor the inventive concept of the assembly can readily be adapted for use as a stand-alone model.

Although the invention has been described by making detailed reference to the preferred embodiments, such detail is to be understood in an instructive rather than in any restrictive sense, many other variants being possible within the scope of the claims hereunto appended.

I claim as my invention:

1. A credit card reader with liquid diverter system, comprising:
    (a) a housing including an entry portion adapted to receive a credit card;
    (b) a credit card enclosure disposed within the housing and including an entry portion adapted to receive the credit card; and
    (c) liquid diverting means disposed within the entry portion of the housing, substantially preventing liquid introduced into the housing entry from entering the credit card enclosure but permitting entry of the credit card into the enclosure.
    (d) the liquid diverting means including a movable means and a drainage means, the movable means being movable from a position diverting liquid into the drainage means, while blocking entry into the enclosure, to a position unblocking the entry into the enclosure to permit insertion of the credit card into the enclosure.

2. A credit card reader with liquid diverter system, comprising:
    (a) a housing including an entry portion adapted to receive a credit card;
    (b) a credit card enclosure disposed within the housing and including an entry portion adapted to receive the credit card; and
    (c) liquid diverting means disposed within the entry portion of the housing, substantially preventing liquid introduced into the housing entry from entering the credit card enclosure but permitting entry of the credit card into the enclosure;
    (d) the liquid diverting means including a flap engageable by the credit card and a drainage means, the flap being swingable from a first position blocking entry into the enclosure and diverting liquid into the drainage means, to a second position unblocking entry into the enclosure to permit insertion of the credit card.

3. A credit card reader with liquid diverter system, comprising:
    (a) a housing including an entry portion adapted to receive a credit card;
    (b) a credit card enclosure disposed within the housing and including an entry portion adapted to receive the credit card; and
    (c) liquid diverting means disposed within the entry portion of the housing, substantially preventing liquid introduced into the housing entry portion from entering the credit card enclosure but permitting entry of the credit card into the enclosure;
    (d) the housing entry portion including an upper portion and a lower portion; and (e) the liquid diverting means including a resilient flap disposed in the housing entry portion in swinging relation to the upper portion and a drainage trough disposed in the lower portion, the flap being movable by engagement with the credit card from a first position blocking liquid entry into the enclosure to a second position unblocking entry into the enclosure to permit insertion of the credit card and the drainage trough having a plurality of openings facilitating vertical drainage of liquid from the housing.

4. A credit card reader with a liquid diverter system comprising:

(a) a housing including a lower portion and an upper portion, said upper portion being disposed in snap-fitting relation to said upper portion, said lower and upper portions having outwardly extending portions cooperating to define a housing entry portion;

(b) a credit card enclosure disposed within the reader housing and having an entry for a credit card;

(c) a liquid diverting means disposed within the housing entry including a movable resilient flap and a drainage trough formed in the lower portion of the housing entry;

(d) said movable flap being movable by the credit card from a first position deflecting liquid into the drainage trough and blocking entry into the credit card enclosure to a second position unblocking entry into the enclosure to permit insertion of the credit card.

5. A reader as defined in claim 4, in which:

(e) the upper portion of the housing entry portion includes spaced openings and the flap includes spaced ears received by associated openings to hold the flap in swinging relation; and (f) the lower housing portion includes rib means retaining the enclosure within the housing.

6. A reader as defined in claim 5, in which:

(g) the rib means defines a side of the trough and the trough includes a plurality of drainage openings and means carrying liquid from the drainage openings away from the housing.

7. A reader as defined in claim 6, in which:

(h) the drainage openings are disposed transversely lengthwise of the trough to permit rapid vertical drainage from said trough.

\* \* \* \* \*